(12) United States Patent  (10) Patent No.: US 8,573,681 B2
Yamato et al.  (45) Date of Patent: Nov. 5, 2013

(54) HYDRAULIC EXCAVATOR

(75) Inventors: Akira Yamato, Hirakata (JP); Takehiko Shibuya, Minou (JP); Tetsuji Nihei, Kyoto (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 13/809,394

(22) PCT Filed: May 24, 2012

(86) PCT No.: PCT/JP2012/063249
§ 371 (c)(1),
(2), (4) Date: Jan. 9, 2013

(87) PCT Pub. No.: WO2012/172948
PCT Pub. Date: Dec. 20, 2012

(65) Prior Publication Data
US 2013/0115036 A1    May 9, 2013

(30) Foreign Application Priority Data
Jun. 17, 2011   (JP) .................................. 2011-135230

(51) Int. Cl.
*B60N 99/00*    (2006.01)
(52) U.S. Cl.
USPC .................................. 296/190.05; 296/190.01
(58) Field of Classification Search
USPC .............. 296/190.01, 190.04, 190.05, 190.08
See application file for complete search history.

(56) References Cited

U.S. PATENT DOCUMENTS

2006/0185200 A1* 8/2006 Sugiyama et al. .............. 37/466
2009/0088931 A1* 4/2009 Budde et al. .................... 701/50

FOREIGN PATENT DOCUMENTS

| JP | 2002-322674 A | 11/2002 |
| JP | 2005-133495 A | 5/2005 |
| JP | 2007-77633 A | 3/2007 |
| JP | 2007-77700 A | 3/2007 |
| JP | 2009-68258 A | 4/2009 |

* cited by examiner

*Primary Examiner* — Lori Lyjak
(74) *Attorney, Agent, or Firm* — Global IP Counselors, LLP

(57) ABSTRACT

A hydraulic excavator includes a lower travel body, an upper swivel buds, a harness and a bracket. The harness is drawn out from an interior of a cab, disposed between the cab and a center frame, and connected to electrical components. The bracket is secured to the cab and supports the harness along a side surface of the cab. The harness is supported about a periphery of the bracket, and has a first, portion downwardly drawn out from a bottom surface of the cab, a second portion extending more outward than the side surface of the cab and forward from the first portion along the bottom surface of the cab, a third portion extending upward from the second portion along the side surface of the cab, and a fourth portion extending toward a rear part of the hydraulic excavator from the third portion along the side surface of the cab.

4 Claims, 8 Drawing Sheets

HYDRAULIC EXCAVATOR

CROSS-REFERENCE TO RELATED APPLICATIONS

This application claims priority to Japanese Patent Application No. 2011-135230 filed on Jun. 17, 2011, the disclosure of which is hereby incorporated herein by reference in its entirety.

TECHNICAL FIELD

The present invention relates to a hydraulic excavator, and particularly to a wiring structure for a harness provided to the hydraulic excavator.

BACKGROUND ART

Hydraulic excavators are provided with a lower travel body and an upper swivel body swivelably mounted on the lower travel body. An engine and/or hydraulic motor is provided to the upper swivel body, and a cab in which a driver seat, control levers, and the like are disposed is mounted on the upper swivel body. A work implement composed of a boom, an arm, a bucket, and the like is furthermore provided to the upper swivel body.

Sensors, lights, and various other electronic equipment is disposed on the upper swivel body. The electronic equipment is connected by a harness to a control panel or the like in the cab, and various structures for wiring the harness have been conventionally proposed.

For example, in the wiring structure described in Japanese Laid-open Patent Application No. 2007-77700, a groove is formed in the front surface of the fuel tank, and a harness and/or cables extending from the battery and/or an electronic equipment assembly are wired in this groove.

Japanese Laid-open Patent Application No. 2005-133495 describes a structure in which a signal line group for connecting control lever devices and control valves is introduced to the interior of the driver seat support base, and then drawn out to the control valve-side by way of a vertical opening formed in the bottom of the driver seat.

SUMMARY

The cab of a hydraulic excavator is supported on a swivel frame via a cab mount. The cab mount must be replaced when worn out. In the procedure for replacing the cab mount, the cab is lifted to a predetermined height and the cab mount is exchanged in this state.

Since the cab is lifted during such replacement of the cab mount, it is necessary to detach hoses, the harness, and the like connecting swivel frame and the cab or the equipment and/or devices inside the cab. Also, the previously detached hoses, harness, and the like must be connected to equipment or the like after cab mount replacement. Since such work is complicated, there is a need to minimize the work of detaching and attaching the hoses, harness, and other members.

In recent years, the move toward hybrids is progressing in hydraulic excavators as well. In such hybrid hydraulic excavators, a power generation motor, inverter, capacitor, and the like are provided in addition to the engine and/or hydraulic motor. Power cables are wired for electrically connecting the equipment. Therefore, interference with the power cables must be avoided when the harness is wired. However, when excess effort, is made to avoid interference with the power cable, there may be cases in which a bend (kink) is formed in the harness. Relatively high voltage electricity flows to the power cable, and noise therefore readily enters the signals communicated by way of the harness when the power cables and harness are brought close to each other.

An object of the present invention is to provide a wiring structure for a harness that can facilitate work when the cab mount is replaced in a hydraulic excavator.

The hydraulic excavator according to a first aspect comprises a lower travel body, an upper swivel body, a harness, and a bracket. The upper swivel body includes a swivel frame having a center frame and left and right decks provided so as to project outward in both directions of the widthwise direction of the vehicle from the center frame, the upper swivel body being swivelably supported on the lower travel body, and having a drive source, a work implement, a cab mounted on one of the left and right decks, and a plurality of electrical components. A harness is drawn out from the cab interior, disposed between the cab and the center frame, and connected to the electrical components. A bracket is secured to the cab and used for supporting the harness along the cab-side surface. The harness is supported about the periphery of the bracket, and has a first portion downwardly drawn out from the bottom surface of the cab, a second portion extending more outward than a side surface of the cab and forward from the first portion along the bottom surface of the cab, a third portion extending upward from the second portion along the side surface of the cab, and a fourth portion extending toward the rear of the vehicle from the third portion along the side surface of the cab.

In this case, the harness drawn out from the cab is supported along the cab-side surface by a bracket secured to the cab. Accordingly, when the cab is lifted during cab mount replacement, the harness is lifted together with the cab in a state supported by the bracket. For this reason, the connection end of the harness on the cab side is not required to be detached during replacement of the cab mount and work is facilitated.

For example, in the case that the harness is supported along the bottom surface of the cab, a worker must install the harness from below with the cab in a state lifted by a crane or the like, i.e., with the cab in a state suspended above the swivel frame in the assembly work for mounting the cab on the swivel frame.

In view of the above, in the first aspect, the harness is disposed between the cab and the center frame. Accordingly, a portion of the harness is first attached to the cab via the bracket, the cab is then mounted on the swivel frame, after which the harness can be attached to the swivel frame or the like, thus facilitating assembly work.

Furthermore, in the first aspect, the harness downwardly drawn out from the bottom surface of the cab is drawn out forward, then drawn around to the side surface of the cab, and thereafter drawn around rearward along the side surface of the cab. In this structure, the harness can be wired smoothly, and kinks in the harness can be avoided.

The hydraulic excavator according to a second aspect is the hydraulic excavator according to the first aspect, wherein the bracket has a mounting part mounted on the bottom surface of the cab, and a plurality of support parts for supporting the third portion and the fourth portion of the harness. Also, the fourth portion of the harness is supported by the center frame further to the rearward side than the portion supported by the support part of the bracket.

The hydraulic excavator according to a third aspect is the hydraulic excavator according to the second aspect, further comprising: a power generation motor disposed in the rear part of the vehicle on one of the left and right decks; an inverter disposed in the front part of the vehicle on the other of the left and right decks; and a power cable provided between the power generation motor and the inverter The center frame has left and right vertical plates extending in the front-rear direction of the vehicle at either end in the vehicle width direction, the left and right vertical plates having openings in the front part-side of the vehicle in the widthwise direction of the vehicle. The power cable passes through the openings in the left and right vertical plates, passes between the first to third portions of the harness and the vertical plate on the side in which the power generation motor is disposed, and extends to the power generation motor side along the vertical plate.

The third aspect relates to a hybrid hydraulic excavator, and a power generation motor and an inverter are disposed on a diagonal line in relation to the vehicle. Accordingly, the power cable for connecting the power generation motor and an inverter must pass through the center frame in the widthwise direction of the vehicle and is liable to interfere with the harness wired between the center frame and the cab.

However, in the third aspect, the harness is drawn out forward and then drawn out to the side surface of the cab, and is therefore not liable to interfere with the power cable that passes through the opening in the center frame.

The hydraulic excavator according to a fourth aspect is the hydraulic excavator according to the second aspect, further comprising: a power generation motor disposed in the rear part of the vehicle on one of the left and right decks; an inverter disposed in the front part of the vehicle on the other of the left and right decks; and a power cable provided between the power generation motor and the inverter. The center frame has left and right vertical plates at both ends in the widthwise direction of the vehicle, and an opening that passes through in the widthwise direction of the vehicle in the vehicle front side of at least, of the left and right vertical plates, the vertical plate of the side on which the inverter is disposed. The power cable is disposed so as to pass through the opening in the vertical plate of the side on which the inverter is disposed, and extend to the power generation motor side along the inner side of the vertical plate of the side on which the power generation motor is disposed. The harness is disposed along the side surface of the vertical plate on the side opposite from the power cable with the vertical plate disposed therebetween.

In the same manner as the third aspect, the fourth aspect relates to a hybrid hydraulic excavator, and the power generation motor and the inverter are disposed on a diagonal line in relation to the vehicle. Accordingly, the power cable for connecting the power generation motor and an inverter must pass through the center frame in the widthwise direction of the vehicle and is liable to come into proximity with the harness wired between the center frame and the cab.

In such a case, noise is readily generated in the signals communicated by the harness when the power cable and the harness are proximate to each other because relatively high voltage electricity flows through the power cable.

In view of the above, in the fourth aspect, the power cable is wired on the inner side of the vertical frame of the center frame, and the harness is wired on the opposite side with the vertical frame disposed therebetween. Accordingly, noise is not liable to be included in the signals communicated by the harness.

Effect of the Invention

In the present invention described above, work during replacement of the cab mount is facilitated in a hydraulic excavator. In the present invention, physical interference of the power cable and the harness can be avoided and noise is not liable to be generated in the signals communicated by the harness in a hybrid hydraulic excavator.

DESCRIPTION OF EMBODIMENTS

Overall Configuration

Figure 1:
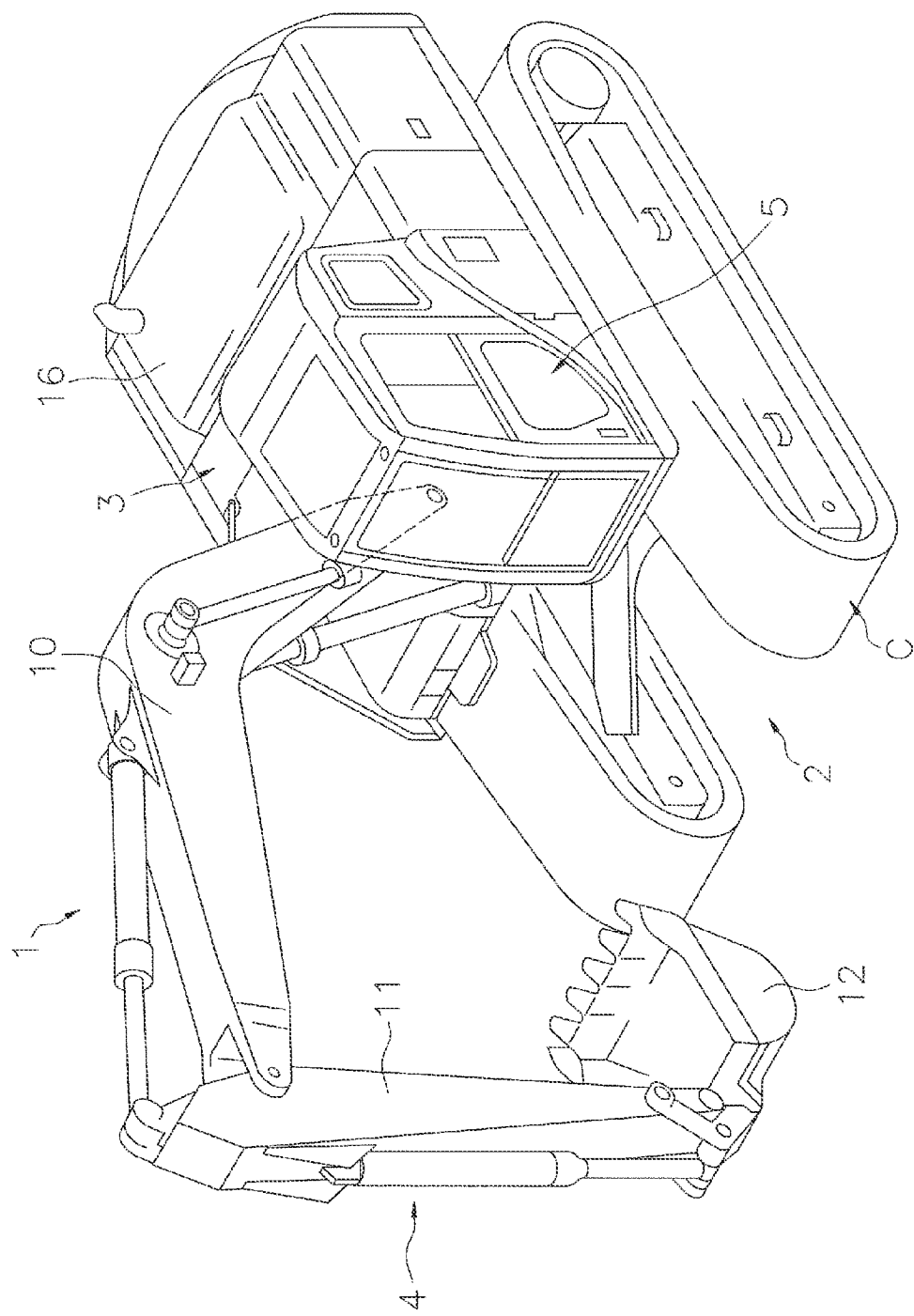
FIG. 1 is a perspective view of a hybrid hydraulic excavator according to an embodiment of the present invention.

The hydraulic excavator 1 according to an embodiment of the present invention is shown in FIG. 1. The hydraulic excavator 1 is a hybrid hydraulic excavator, and is provided with a lower travel body 2, an upper swivel body 3, a work implement 4, and a cab 5. In the description below, the terms "front," "rear," "left," and "right" are directions determined by reference to an operator seated in the driver seat. Therefore, the left and right directions are equivalent to the widthwise direction of the vehicle.

The lower travel body 2 has a pair of crawler belts C on the left and right sides, and travel is made possible by driving the crawler belts C. The upper swivel body 3 is swivelably supported by the lower travel body 2, and swiveling in an arbitrary direction is made possible by a swivel device 6 that includes a swivel motor or the like (see FIG. 2). The work implement 4 and the cab 5 are mounted on the upper swivel body 3. The work implement 4 has a boom 10, an arm 11, and a bucket 12. The work implement 4 has a plurality of hydraulic cylinders for driving the constituent members 10 to 12. Also, an engine (not shown) is disposed in a horizontal arrangement in the rear part of the upper swivel body 3.

Swivel Frame and Main Constituent Elements Mounted On Swivel Frame

Figure 2:
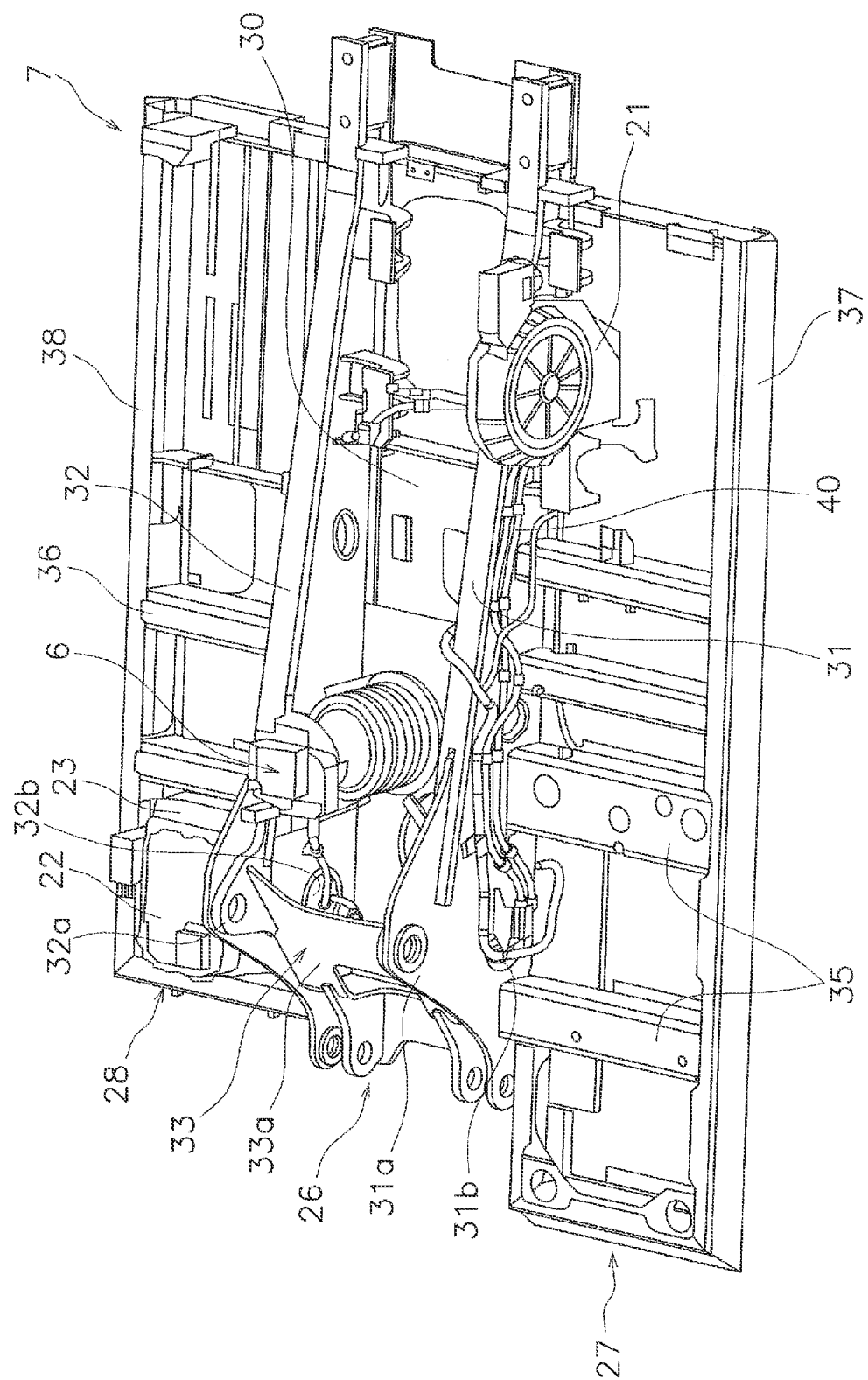
FIG. 2 is a perspective view of the swivel frame and equipment mounted thereon of the hydraulic excavator shown in FIG. 1.
Figure 3:
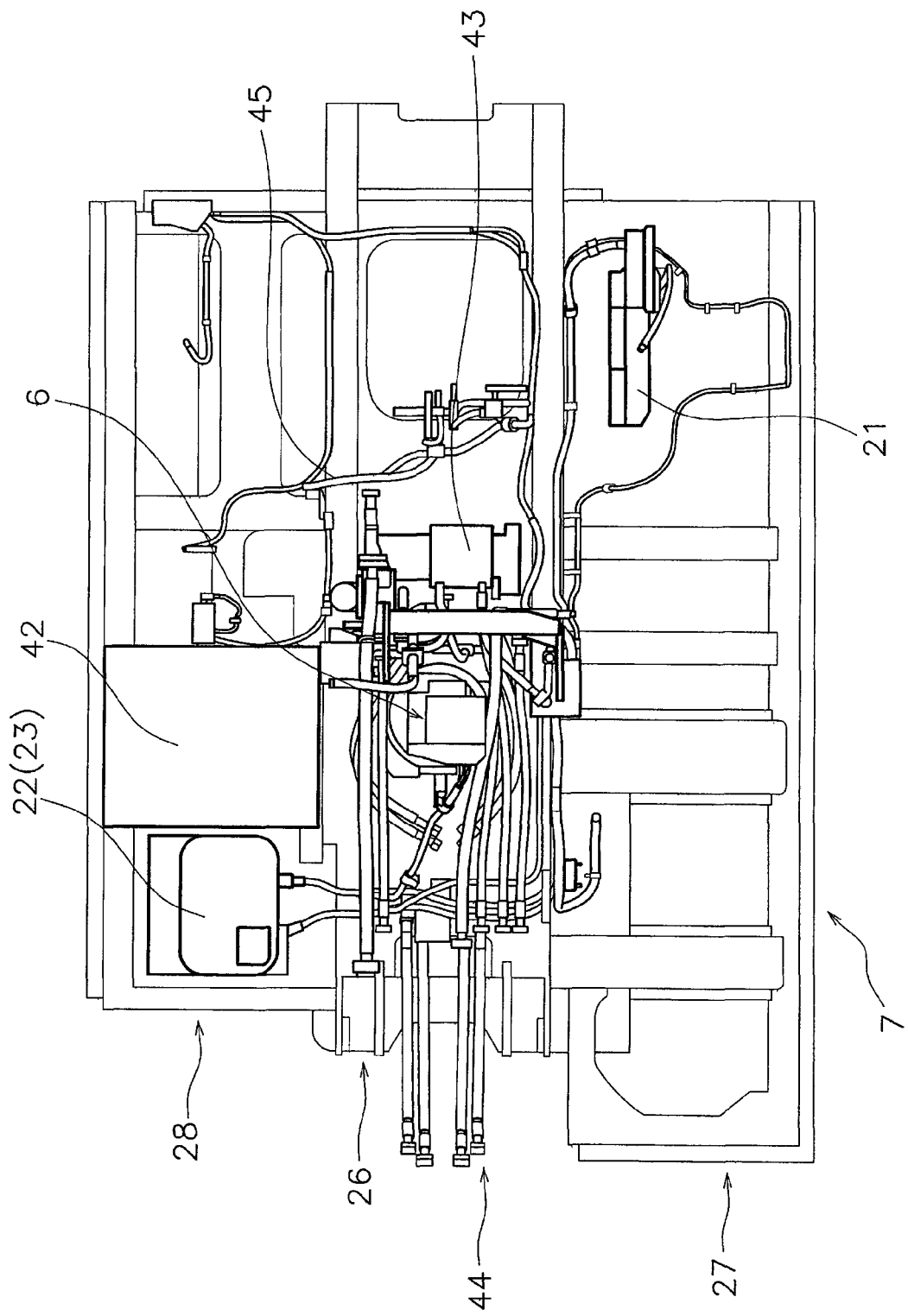
FIG. 3 is a plan view of the swivel frame and equipment mounted thereon of the hydraulic excavator shown in FIG. 2.

FIGS. 2 and 3 show a swivel frame 7 constituting the upper swivel body 3, and the main constituent elements mounted on the swivel frame 7. Mounted on the swivel frame 7 are a power generation motor 21 as an electrical component, an inverter 22 as a converter, and a capacitor 23 as an electricity storage unit. Also disposed on the swivel frame 7 is a swivel device 6 composed of a swivel motor supported by the lower travel body 2, and/or gears or the like supported by the swivel frame 7.

The swivel frame 7 has a center frame 26, and left and right decks 27, 28.

The center frame 26 has a base plate 30, and left and right vertical plates 31, 32. The base plate 30 extends in the front-rear direction, and has a plurality of openings that includes an opening in which the swivel device 6 is disposed. The left and right vertical plates 31, 32 are secured to both left and right ends of the base plate 30. A pair of support parts 31a, 32a having a triangular shape as viewed from the side is formed on the front end parts of the left and right vertical plates 31, 32, and the pair of support parts 31a, 32a are coupled by a coupling plate 33a. A center bracket 33 for supporting the proximal end part of the work implement 4 is composed of the pair of support parts 31a, 32a and the coupling plate 33a. The left and right vertical plates 31, 32 extend rearward from the center bracket 33, and gradually decrease in height further toward the rear. Openings 31b, 32b that pass through in the left and right directions are formed in the lower end parts of the pair of support parts 31a, 32a of the left and right vertical plates 31, 32.

The left and right decks 27, 28 have a plurality of crossbeams 35, 36, and side plates 37, 38. The crossbeams 35, 36 are provided so as to project outward to the left and right from the center frame 26. The side plates 37, 38 couple the outermost peripheral parts of the left and right plurality of crossbeams 35, 36, respectively, in the front-rear direction.

The power generation motor 21 is disposed on the rear end of the left deck 27. The inverter 22 and the capacitor 23 are disposed on the front end of the right deck 28. Two power cables 40 are disposed between the power generation motor 21 and the inverter 22. The arrangement of the power cables 40 is described hereafter.

A fuel tank 42 is disposed behind the inverter 22 and the capacitor 23 on the right deck 28, as shown in FIG. 3. A control valve 43 is disposed behind the swivel device 6 in the center frame 26, and various hydraulic piping 44 coupled to the control valve 43 is disposed in the center frame 26. A fuel pipe 45 for supplying fuel to the engine is disposed behind the fuel tank 42.

Power Cable

As described above, two power cables 40 are connected between the power generation motor 21 and the inverter 22. The power cables 40 are also provided between the inverter 22, the swivel motor of the swivel device 6, and the capacitor 23.

Figure 4:
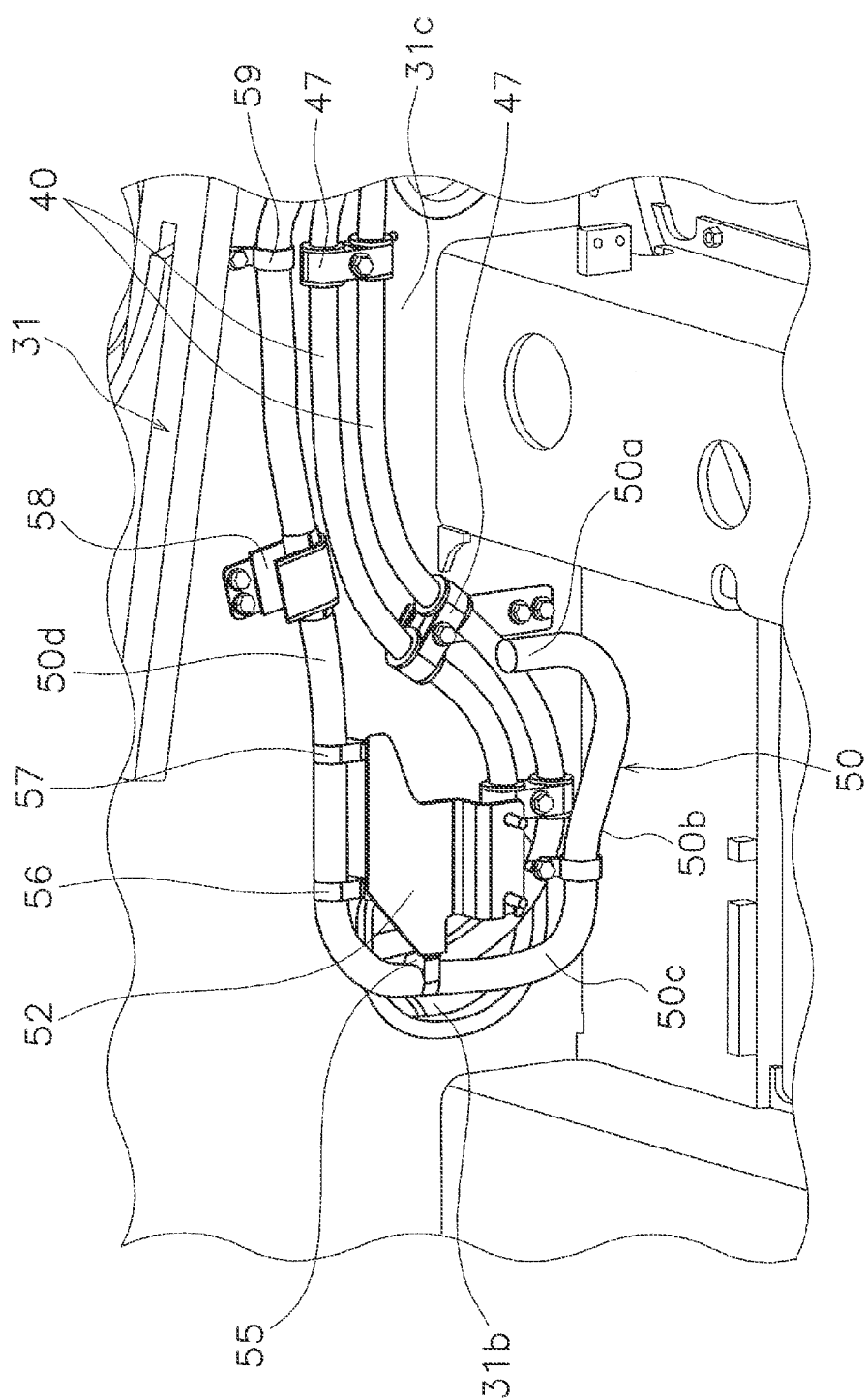
FIG. 4 is a perspective view showing the wiring structure of the harness and power cables.

The power cables 40 connecting the inverter 22 and the power generation motor 21 pass through an opening 32b of a right vertical plate 32, pass below the center bracket 33, pass through an opening 31b of the left vertical plate 31, and are drawn out to the left deck 27 side, as shown in FIG. 2 and FIG. 4, which is a partial enlarged view of FIG. 2. The power cables 40 are then connected to the power generation motor 21 along the outer side surface 31c of the left vertical plate 31. The two power cables 40 wired along the left vertical plate 31 are secured to the side surface 31c of the left vertical plate 31 via a plurality of clamps 47.

As described above, the power cables 40 are disposed so as to avoid the hydraulic piping 44, the fuel tank 42, and the fuel pipe 45.

Cab

Figure 5:
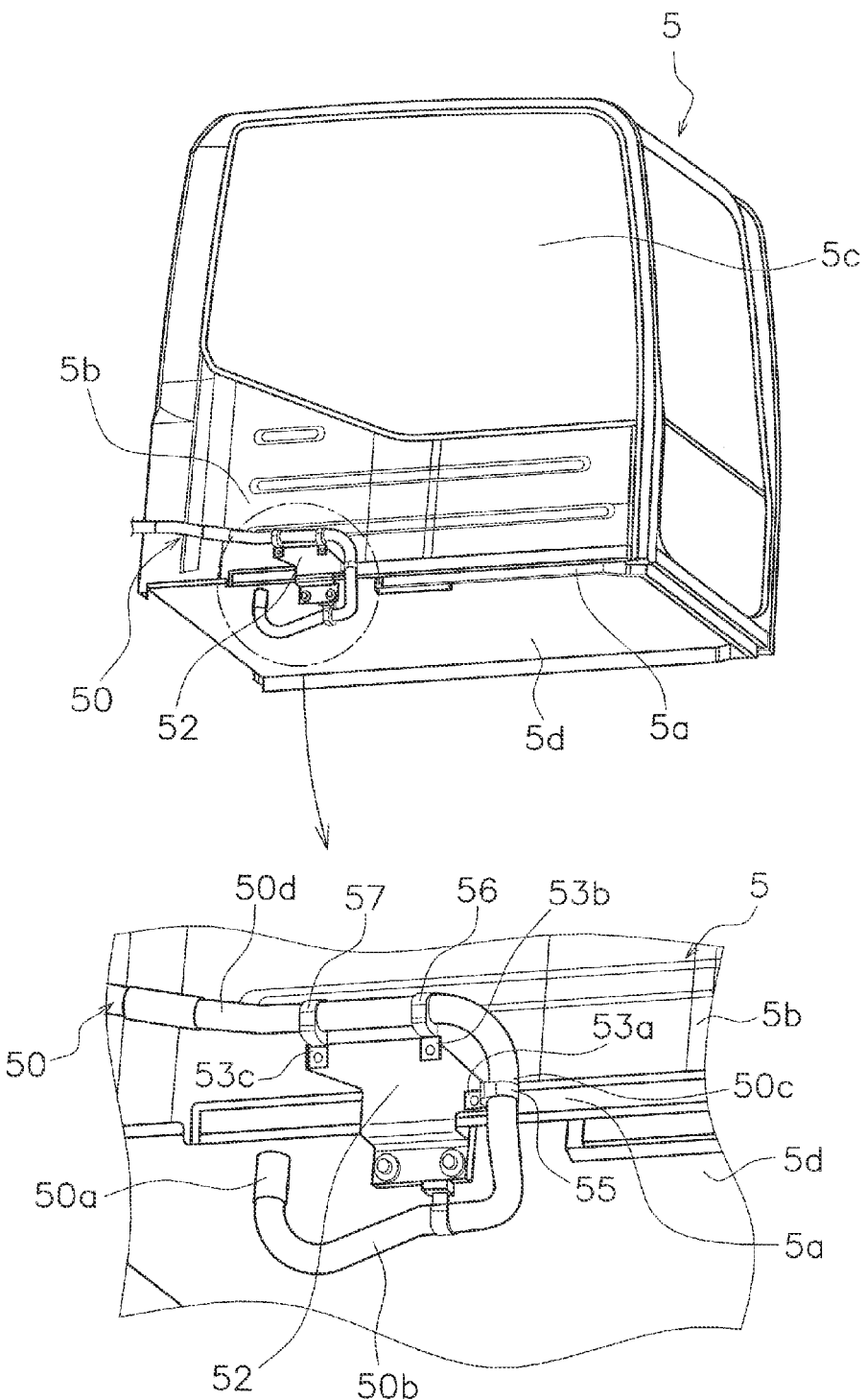
FIG. 5 is a perspective view showing the cab, and the harness and bracket supported on the cab.

The cab 5 is disposed on the front portion of the left deck 27. The cab 5 is composed of a frame 5a constituting the frame of the entire cab, an exterior covering 5b, window 5c, and door (not shown) mounted on the frame 5a, as shown in FIG. 5. Although not shown in the drawing, a driver seat, control levers, display controller, monitor, and the like are provided inside the cab 5. Wires are connected to these devices, and the wires are bundled and drawn out as a harness 50 from the bottom surface 5d of the cab 5.

Harness and Bracket

The harness 50 is drawn downward from the bottom surface 5d of the floor of the cab 5, and connected to sensors and/or various electrical components provided to the rear of the vehicle, as described above. More specifically, the harness 50 is drawn downward from the bottom surface 5d of the floor of the cab 5 (first portion 50a), extended forward along the bottom surface 5d of the cab 5 and more outward than the exterior side surface 5b (hereinbelow merely referred to as side surface) of the cab 5 (second portion 50b), furthermore extended upward along the side surface 5b of the cab 5 (third portion 50c), and then extended to in the rear direction of the vehicle along the side surface 5b of the cab 5 (fourth portion 50d), as shown in FIG. 4 (in which cab 5 is not shown) and the enlarged partial view in FIG. 5.

As described above, the harness 50 is first drawn out forward and then curved upward up to the cab side surface 5b. Therefore, interference between the harness 50 and the power cables 40 wired through the opening 31b of the left vertical plate 31 can be avoided. The harness 50 is not bent smoothly, and it is therefore possible to avoid kinks in the harness 50.

Figure 6:
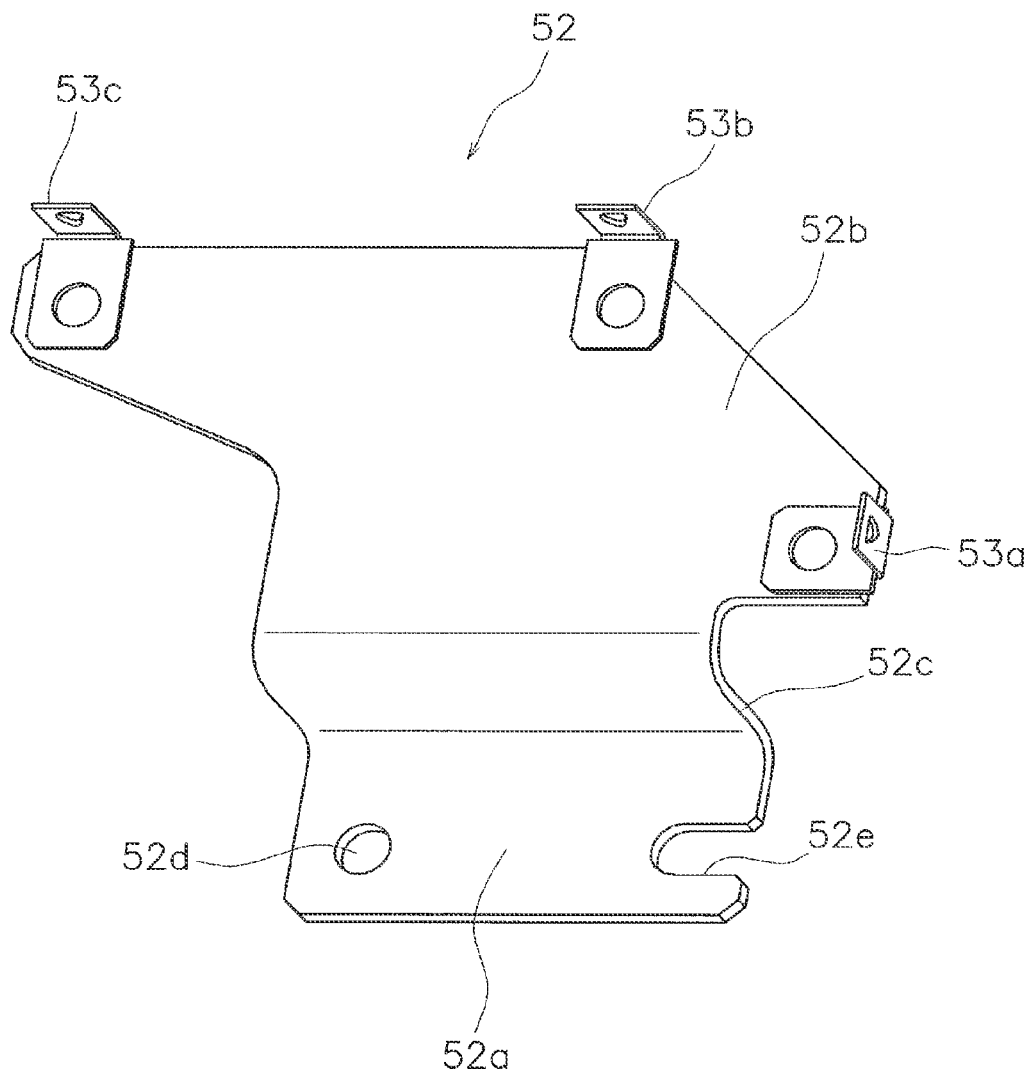
FIG. 6 is a perspective view of the bracket.

The harness 50 wired in the manner described above is supported by a bracket 52 secured to the cab 5. The bracket 52 has a mounting part 52a and a main body part 52b, as shown in FIG. 6. The mounting part 52a and the main body part 52b are stepped and have a horizontal part 52c therebetween.

A through-hole 52d and a notch 52e are formed in the mounting part 52a. The notch 52e is lengthily formed in the lateral direction and one end is open outward. The bracket 52 is secured by bolts to the frame 5a on the bottom surface constituting the cab 5 through the through-hole 52d and the notch 52e.

The main body part 52b is substantially parallel to the side surface 5b of the cab 5 with the bracket 52 in a state attached to the cab 5. A first support part 53a is secured by welding or the like to the front end side of the main body part 52b, and a second support part 53b and a third support part 53c are similarly secured by welding or the like to the upper end of the main body part. 52b with a predetermined interval in the front-rear direction.

As shown in FIGS. 4 and 5, the third portion 50c of the harness 50 that is drawn out upward along the cab side surface 5b is supported by the first support part. 53a of the bracket 52 by the clamp 55. The fourth portion 50d extending in the rear direction of the vehicle along the cab side surface 5b of the harness 50 is supported by the second support part. 53b and the third support part 53c by two clamps 56, 57.

The harness 50 is supported on the outer side surface 31c of the left vertical plate 31 by a simple clamp 58 and a plurality of clamps 59 (only a single clamp is shown in FIG. 4), as shown in FIG. 4, behind the portion supported by the bracket 52. The simple clamp 58 is disposed at the position closest to the bracket 52. The simple clamp 58 is formed by a U-shaped plate and is open upward. Accordingly, it is possible to detach only the harness 50 from the left vertical plate 31 with the simple clamp 58 still installed on the left vertical plate 31.

Mounting Cab on Swivel Frame

In the case that the cab 5 is mounted on the swivel frame 7 in the assembly step, the harness 50 is installed on the cab 5 in advance via the bracket 52, as shown in FIG. 5. In this state, the cab 5 is mounted on the left deck 27 of the swivel frame 7.

At this time, the harness 50 is disposed between the right side surface 5b of the cab 5 and the left vertical plate 31 of the center frame 26. After the cab 5 has been mounted on the swivel frame 7, the portion of the harness 50 extending to the rear is secured by the clamps 59 to the side surface of the left vertical plate 31.

As described above, in the present embodiment, the harness 50 can be installed on the left vertical plate 31 after the cab 5 has been mounted on the swivel frame 7. Therefore, work for assembling the harness 50 in a state in which the cab 5 has been lifted by a lift or the like is not required, and the work for assembling the harness 50 is facilitated.

During Replacement of Cab Mount

Figure 7:
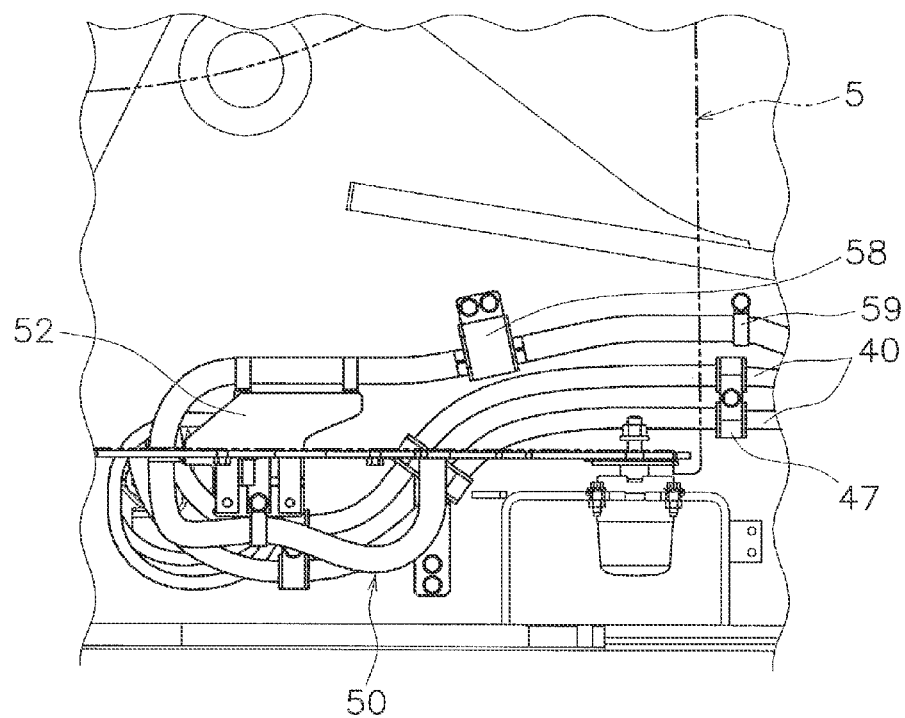
FIG. 7 is a side surface view showing the wiring structure of the harness and power cables.
Figure 8:
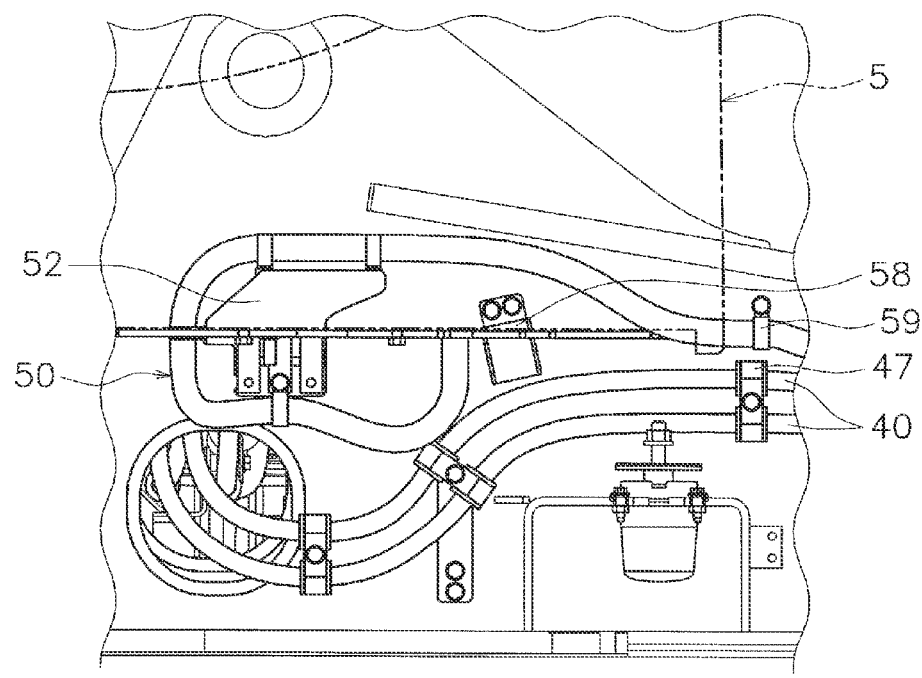
FIG. 8 is a side surface view showing the state in which the cab has been lifted up from the state shown in FIG. 7.

FIG. 7 shows the state in which the cab 5 has been mounted on the swivel frame 7. Bolts (not shown) that secure the cab 5 to the swivel frame 7 are detached when the cab mount (not shown) is to be replaced. The cab 5 is lifted, e.g., 200 mm by a lift. FIG. 8 shows the state in which the cab 5 has been lifted up. At this time, the harness 50 is supported by the bracket 52 secured to the cab 5. Also, the portion nearest to the bracket 52 is supported by the simple clamp 58. Accordingly, the harness 50 can be lifted upward together with the cab 5 without detaching the simple clamp 58 and/or the other clamps 59 from the left vertical plate 31. Therefore, work for replacing the cab mount is considerably facilitated.

The characteristics of the present embodiment are summarized below.

(1) Physical interference with the power cables 40 can be avoided by wiring the harness 50 in the manner shown in the present embodiment. Also, kinks in the harness 50 can be avoided.

(2) The harness 50 is supported by the bracket 52 secured to the cab 5, and the harness 50 is disposed between the cab side surface 5b and the left vertical plate 31. Therefore, assembly work is facilitated when the cab 5 is mounted on the swivel frame 7.

(3) The harness 50 is installed on the cab 5 via the bracket 52, and the portion of the harness 50 near the bracket 52 is supported by the simple clamp 58, and the replacement work of the cab mount is therefore facilitated.

(4) The power cables 40 can be disposed away from the fuel tank 42, the fuel pipe 45, and the hydraulic piping 44.

Other Embodiments

The present invention is not limited an embodiment such as that described above, and various modifications and adjustments can be made without departing from the scope of the present invention.

Figure 9:
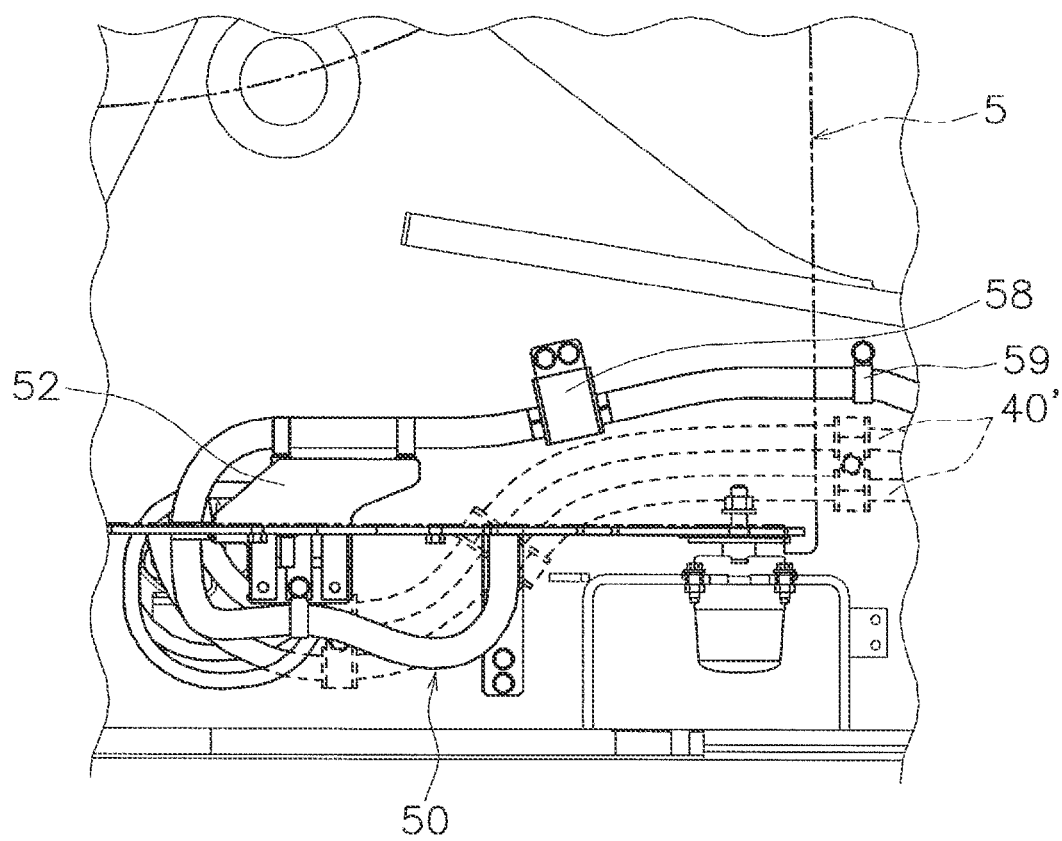
FIG. 9 is a view that corresponds to FIG. 7 in accordance with another example of the present invention.

In the embodiment described above, the power cables 40 were disposed along the outer side surface of the left vertical plate 31, but power cables 40' may be disposed along the inner side surface of the left vertical plate 31, as shown in FIG. 9. In this case, the left vertical plate 31 is present between the power cables 40' and the harness 50. Therefore, generation of noise from the power cables 40' in the signals communicated via the harness 50 can be minimized.

In the hydraulic shovel of the illustrated embodiments, work during replacement of the cab mount is facilitated. Physical interference of the power cable and the harness can be avoided and noise is not liable to be generated in the signals communicated by the harness in a hybrid hydraulic excavator to which the present invention has been applied.

The invention claimed is:

1. A hydraulic excavator comprising:
a lower travel body;
an upper swivel body including a swivel frame having a center frame and left and right decks provided so as to project outward in both directions of a widthwise direction of the hydraulic excavator from the center frame, the upper swivel body being swivelably supported on the lower travel body, and having a drive source, a work implement, a cab mounted on one of the left and right decks, and a plurality of electrical components;
a harness drawn out from an interior of the cab, disposed between the cab and the center frame, and connected to the electrical components; and
a bracket secured to the cab and supporting the harness along a side surface of the cab, wherein
the harness is supported about a periphery of the bracket, and has a first portion downwardly drawn out from a bottom surface of the cab, a second portion extending more outward than the side surface of the cab and forward from the first portion along the bottom surface of the cab, a third portion extending upward from the second portion along the side surface of the cab, and a fourth portion extending toward a rear part of the hydraulic excavator from the third portion along the side surface of the cab.

2. The hydraulic excavator as recited in claim 1, wherein the bracket has a mounting part mounted on the bottom surface of the cab, and a plurality of support parts supporting the third portion and the fourth portion of the harness; and
the fourth portion of the harness is supported by the center frame further to a rearward side than a portion supported by the support parts of the bracket.

3. The hydraulic excavator as recited in claim 2, further comprising:
a power generation motor disposed in the rear part of the hydraulic excavator on one of the left and right decks;
an inverter disposed in a front part of the hydraulic excavator on the other of the left and right decks; and
a power cable provided between the power generation motor and the inverter, wherein
the center frame has left and right vertical plates extending in a front-rear direction of the hydraulic excavator at both ends in the widthwise direction of the hydraulic excavator, and the left and right vertical plates having openings in a front part-side of the hydraulic excavator in the widthwise direction of the hydraulic excavator, and
the power cable passes through the openings in the left and right vertical plates, passes between the first to third portions of the harness and one of the left and right vertical plates on a side in which the power generation motor is disposed, and extends toward a side of the power generation motor along the one of the left and right vertical plates.

4. The hydraulic excavator as recited in claim 2, further comprising:
a power generation motor disposed in the rear part of the hydraulic excavator on one of the left and right decks;
an inverter disposed in a front part of the hydraulic excavator on the other of the left and right decks; and
a power cable provided between the power generation motor and the inverter, wherein
the center frame has left and right vertical plates at both ends in the widthwise direction of the hydraulic excavator, and a front side of at least one of the left and right vertical plates disposed on a side on which the inverter is disposed has an opening that passes through in the widthwise direction of the hydraulic excavator;

the power cable passes through the opening in the one of the left and right vertical plates, and extends toward a side of the power generation motor along an inner side of the other of the vertical plates on a side on which the power generation motor is disposed; and the harness is disposed along a side surface of the other of the left and right vertical plates on a side opposite from the power cable with the other of the left and right vertical plates being disposed between the power cable and the harness.

* * * * *